(12) United States Patent
Ackerman et al.

(10) Patent No.: US 6,884,461 B2
(45) Date of Patent: *Apr. 26, 2005

(54) TURBINE NOZZLE WITH HEAT REJECTION COATS

(75) Inventors: John Frederick Ackerman, Laramie, WY (US); Paul Arszman, Cincinnati, OH (US); Andrew J. Skoog, West Chester, OH (US)

(73) Assignee: General Electric Company, Schenectady, NY (US)

( * ) Notice: Subject to any disclaimer, the term of this patent is extended or adjusted under 35 U.S.C. 154(b) by 42 days.

This patent is subject to a terminal disclaimer.

(21) Appl. No.: 10/325,000

(22) Filed: Dec. 20, 2002

(65) Prior Publication Data

US 2004/0121171 A1 Jun. 24, 2004

(51) Int. Cl.⁷ .............................. B05D 1/38; B05D 3/04; B05D 7/14
(52) U.S. Cl. .................... 427/229; 427/226; 427/376.4; 427/376.6; 427/377; 427/380; 427/405; 427/419.2; 427/419.3
(58) Field of Search ................................. 427/377, 380, 427/405, 419.2, 419.3, 419.8, 399, 376.6, 376.4, 226, 229

(56) References Cited

U.S. PATENT DOCUMENTS

| | | |
|---|---|---|
| 2,927,043 A | 3/1960 | Stetson |
| 3,345,197 A | 10/1967 | Martini et al. |
| 3,415,672 A | 12/1968 | Levinstein et al. |
| 3,676,085 A | 7/1972 | Evans et al. |
| 3,819,338 A | 6/1974 | Bungardt et al. |
| 3,961,910 A | 6/1976 | Baladjanian et al. |
| 3,978,251 A | 8/1976 | Stetson et al. |
| 4,070,507 A | 1/1978 | Stueber et al. |
| 4,101,714 A | 7/1978 | Rairden, III |
| 4,101,715 A | 7/1978 | Rairden, III |
| 4,142,023 A | 2/1979 | Bornstein et al. |
| 4,145,481 A | 3/1979 | Gupta et al. |
| 4,374,183 A | 2/1983 | Deadmore et al. |
| 4,382,976 A | 5/1983 | Restall |
| RE31,339 E | 8/1983 | Dardi et al. |
| 4,656,099 A | 4/1987 | Sievers |
| 5,302,465 A | 4/1994 | Miller et al. |
| 5,464,699 A | 11/1995 | Baldi |
| 5,512,382 A * | 4/1996 | Strangman ................. 428/632 |
| 5,562,998 A | 10/1996 | Strangman |
| 5,624,721 A | 4/1997 | Strangman |
| 5,824,423 A | 10/1998 | Maxwell et al. |
| 5,851,678 A * | 12/1998 | Hasz et al. ................. 428/469 |
| 5,851,679 A * | 12/1998 | Stowell et al. ............. 428/472 |
| 5,876,860 A | 3/1999 | Marijnissen et al. |
| 5,914,189 A * | 6/1999 | Hasz et al. ................. 428/335 |
| 5,981,091 A | 11/1999 | Rickerby et al. |

(Continued)

Primary Examiner—Kirsten C. Jolley
(74) Attorney, Agent, or Firm—K. Scott O'Brian; McNees Wallace & Nurick LLC

(57) ABSTRACT

A method for applying a coating system that is applied to a surface of a component, such as a turbine nozzle, for preventing or at least substantially preventing interdiffusion between the component surface and a protective thermal layer applied to the component surface when the thermal layer is exposed to elevated temperatures. The method includes applying a carrier layer containing aluminum to the component surface. Next, the layer is heated to a first predetermined temperature for a first predetermined period of time in the substantial absence of oxygen to bond the aluminum with the component surface, the heat dissolving the carrier portion of the aluminum layer. The remaining portion of the aluminum layer is then heated to a second predetermined temperature for a second predetermined period of time to form an oxidized aluminum layer. Finally, at least one protective thermal layer is applied over the oxidized aluminum layer.

6 Claims, 2 Drawing Sheets

U.S. PATENT DOCUMENTS

| | | |
|---|---|---|
| 6,103,386 A | 8/2000 | Raybould et al. |
| 6,146,696 A | 11/2000 | Das et al. |
| 6,168,874 B1 * | 1/2001 | Gupta et al. ............... 428/623 |
| 6,207,233 B1 | 3/2001 | Perry et al. |
| 6,253,441 B1 | 7/2001 | Wheat et al. |
| 6,394,755 B1 * | 5/2002 | Stowell et al. .......... 416/241 R |
| 6,485,845 B1 * | 11/2002 | Wustman et al. ........... 428/633 |

* cited by examiner

TURBINE NOZZLE WITH HEAT REJECTION COATS

CROSS-REFERENCE TO RELATED APPLICATIONS

This Application is related to application Ser. No. 10/324,550, filed contemporaneously with this Application on Dec. 20, 2002, entitled "AFTERBURNER SEALS WITH HEAT REJECTION COATS" assigned to the assignee of the present invention and which is incorporated herein by reference, and to application Ser. No. 10/324,704, filed contemporaneously with this Application on Dec. 20, 2002, entitled "COMBUSTION LINER WITH HEAT REJECTION COATS" assigned to the assignee of the present invention and which is incorporated herein by reference.

FIELD OF THE INVENTION

The present invention relates generally to heat rejection coating applied to component surfaces exposed to high temperatures and more particularly to providing a diffusion barrier layer underlying the heat rejection coating to the component surfaces to stabilize and preserve the heat rejection coating.

BACKGROUND OF THE INVENTION

Components exposed to elevated temperatures and mechanical stresses, such as aircraft engines which typically employ nickel, iron or cobalt based superalloys, require protective coatings from corrosion, oxidation and from the high operating temperatures to achieve reliable operation for extended periods of time. More specifically, component surfaces having metallic heat rejection coatings, such as platinum, gold or rhodium which may be sandwiched between a pair of stabilizing layers, such as tantalum, that are exposed to radiative flames exhibit both measurable temperature decrease and increased service life compared to uncoated component surfaces. These heat rejection coatings achieve this temperature decrease by effectively reflecting the radiative energy away from the component surface rather than have this energy absorbed. Accordingly, it is highly desirable to apply these heat rejection coatings to similarly exposed surfaces. However, this is not possible for certain metal alloy parts, such as turbine nozzles, which may be regularly exposed to temperatures exceeding about 788° C. (1450° F.). At this temperature range, the heat rejection coating interdiffuses with the underlying substrate. In essence, a portion of the heat rejection coating material migrates into the component substrate material while elements of the substrate migrate outwardly into the coating material. This interdiffusion causes the reflective heat rejection surface to become a radiation absorber, losing or at least substantially losing its ability to reflect radiative energy, resulting in a reduction of its ability to decrease component surface temperature, thereby decreasing the service life of the component. Therefore, a means to prevent the interdiffusion between component surfaces and the heat rejection coatings is highly desired.

One method to prevent high temperature interdiffusion is the provision of a barrier coating applied between the component surface and the heat rejection surface. A variety of these barrier coatings are known in the art and include paint-on dielectric oxides, chemical vapor deposited oxides and baked-on rare earth oxides. However, none of these barrier coating constructions may be utilized in this application because they either are inefficient in preventing high temperature diffusion or lose their adhesive properties at higher temperatures.

Alternately, it has been shown that nozzles may be covered with a thick macroscopic coating of a ceramic thermal barrier coating, ("TBC"), one type of which is known as "smooth coat," commonly employing a TBC composition referred as "(AJ11)." U.S. Pat. Nos. 5,624,721 and 5,824,423 are directed to methods which employ aluminum bond coat layers for securing TBC coatings. While heat rejection coatings have been shown to remain intact when applied over these TBC coatings, the thick TBC coatings are expensive to manufacture and apply and are extremely heavy, effectively limiting their application to aerospace components.

Thus there is a need in the art for an inexpensive, lightweight means to prevent interdiffusion between component surfaces and heat rejection coatings.

SUMMARY OF THE INVENTION

The present invention is directed to a method for applying a coating system that is applied to a surface of a component for preventing or at least substantially preventing interdiffusion between the substrate and a protective thermal layer applied to the component surface when the surface is exposed to elevated temperatures. The method includes first applying an aluminum-based material to the component surface. In addition to aluminum, this material may include a carrier material and a binder, both of which are typically organic when the material is a paint. The layer is allowed to dry as the carrier material evaporates. Next, the layer is heated to a first predetermined temperature for a first predetermined period of time in the substantial absence of oxygen to metallurgically bond the aluminum with the component surface, the heat volatizing the carrier and binder portion of the aluminum layer. The remaining portion of the aluminum layer is then heated to a second predetermined temperature for a second predetermined period of time in the presence of oxygen to form an oxidized aluminum layer alumina. Finally, at least one protective thermal layer is applied over the alumina.

In a second embodiment, the aluminum layer can be applied by standard commercially available aluminide processes whereby aluminum is reacted at the substrate surface typically at elevated temperatures to form an aluminum or aluminum-containing composition which provides a reservoir for the growth of the aluminum oxidation layer. This aluminum layer is predominantly aluminum, but may also be combined with other metals, including nickel, cobalt and iron to form aluminum rich phases that include nickel, cobalt and iron, or may be formed by contacting at elevated temperatures an aluminum vapor species or aluminum rich alloy powder with the component substrate and depositing the aluminum on the substrate surface. This layer is typically metallurgically bonded to the substrate and may be accomplished by numerous techniques, including a pack cementation process, over-the pack processing, spraying, chemical vapor deposition, electrophoresis, sputtering and slurry sintering with an aluminum rich vapor and appropriate diffusion heat treatments. Aluminum will form highly stable refractory oxide layers at the operating temperature of hot section components which are tightly adherent and cohesive and thus effective to block incursions of corrosive chemical agents into the component substrate, so long as the aluminum oxide layer remains intact while preventing the migration of substrate elements outward. When a coating is applied over the alumina, it prevents the coating elements from migrating inward or the substrate elements from migrating outward. In other words, the oxide layer will act as a barrier to prevent diffusion of elements across it.

A primary advantage of the present invention is that it provides an inexpensive, lightweight means to prevent interdiffusion between the substrate and heat rejection coatings applied over the substrate surfaces exposed to elevated temperatures.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
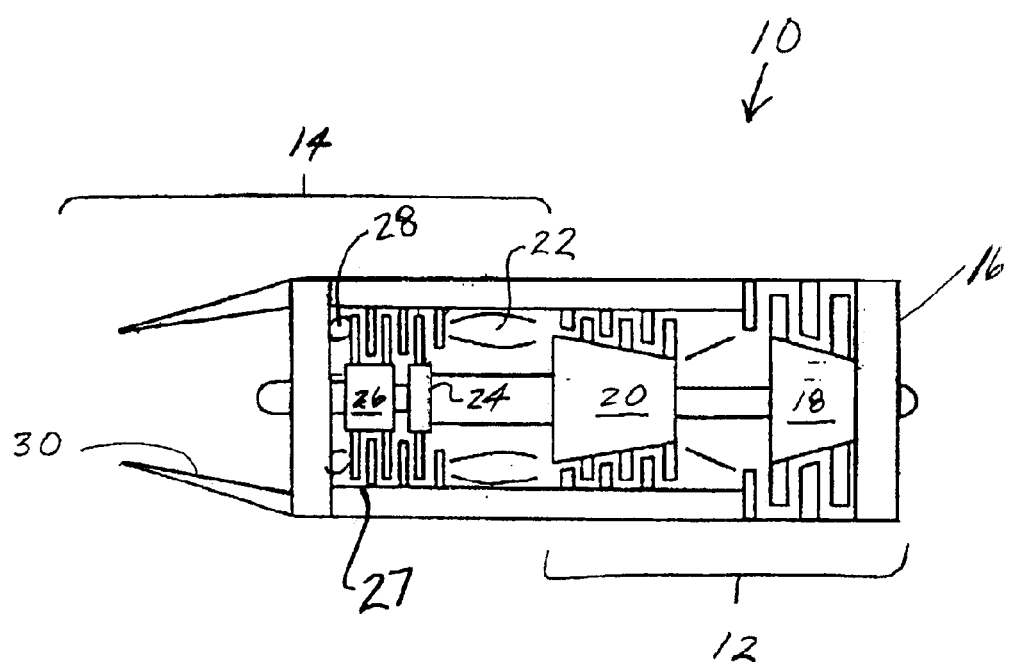
FIG. 1 is a schematic cross sectional view of a jet engine depicting component regions having surfaces suitable for employment of the method for applying a coating system of the present invention.

Referring now to FIG. 1, a core of a jet engine 10 is provided having a hot section 14 which advantageously utilizes the coating system and method of application of the present invention. Engine 10 includes in serial flow relation proceeding in a direction from an inlet 16 to exhaust nozzle 30, through a low pressure compressor 18, a high pressure compressor 20, a combustor 22, a high pressure turbine 24, a low pressure turbine 26, an afterburner 28, and terminating in exhaust nozzle 30. The engine may be of a high-bypass or low-bypass turbofan type which is not depicted in FIG. 1 as this Fig. does not show a front fan. However, the jet engine core operation is fundamentally the same in all jet engines. Afterburners 28 are optional items used in military applications. Air entering inlet 16 is compressed by compressors 18, 20 before reaching combustor 22 where the highly compressed air is mixed with fuel and ignited. This air/fuel exhaust mixture is then propelled through turbines 24, 26 which are urged into rotation by the passing mixture of hot gases to likewise rotatably drive respective compressors 18, 20, since these components are connected to a common drive shaft. Upon reaching optional afterburner 28, as is typically included in certain military applications, fuel is introduced into the mixture stream to augment thrust, utilizing the unburned oxygen in the exhaust gas to support combustion. Afterburners are typically used in military aircraft. They increase the speed of the aircraft for short periods of time, by injecting fuel into the hot exhaust gas stream where it is combusted, thereby providing additional thrust. The temperature of the afterburner flame can exceed about 1,700° C. (about 3,100° F.) so the burners of afterburner 28 are directed radially inward toward the engine axis so that at least a portion of the mixture from turbines 24, 26 flow past the wall of this region, helping maintain wall temperatures at temperature levels reduced somewhat below the temperature of the afterburner combustion. However, the resultant increased temperature of the exhaust gas increases its velocity as it leaves exhaust nozzle 30, providing increased engine thrust.

A turbine nozzle 27 located between combustor 22 and afterburner 28 which is subjected to an amount radiative heat due to combustion of fuel in combustor 22 and afterburner 28, in addition to being subjected to the exhaust mixture passing from combustor 22, will especially benefit from the coating system of the present invention.

Figure 2:
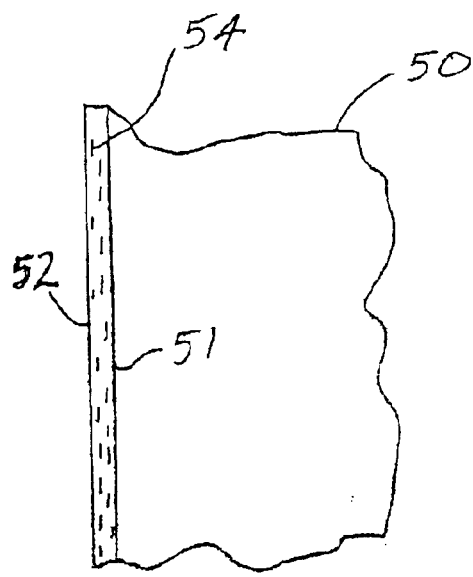
FIG. 2 is an enlarged partial cross sectional view taken from FIG. 1 of a turbine nozzle after a paint coating containing aluminum has been applied.
Figure 4:
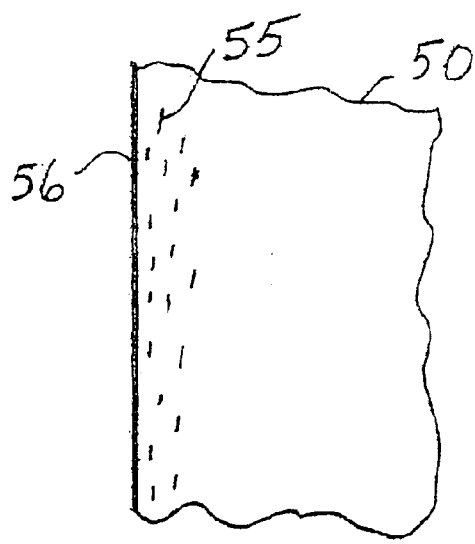
FIG. 4 is the enlarged partial cross sectional view of FIG. 3 of formation of an aluminum oxide layer forming from migration of the diffused aluminum from within the substrate by the application of heat in the presence of oxygen.

Referring to FIG. 2, the application of layer 52 which includes aluminum applied over the substrate 50 shall now be discussed. In the preferred embodiment, sub coating layer 52 is formed from application of commercially available spray paint, such as Krylon® No. 1404, manufactured by Sherwin-Williams Company over substrate 50 of a gas turbine engine, although comparable paints from other manufacturers could likely also be used. It is realized that any of the conventional methods to form this aluminum layer on the gas turbine engine component previously discussed could also be employed. The spray paint includes a carrier fluid, binders and aluminum particles. Carrier fluid contained within the layer as applied, permits layer 52 to be sprayed over a substrate surface 51 of a substrate 50, such as a turbine nozzle. Layer 52 may be applied to substrate surface 51 of substrate 50 in a manner substantially similar to that employed to apply a coat of paint to an article sufficient to "cover" the article. In other words, by applying at least one coat, but preferably two coats of paint of a commercially available spray to surface 51, layer 52 contains an amount of aluminum particles 54 sufficient to ultimately form a continuous aluminum oxide layer 56 (FIGS. 4, 5) on surface 51, as will be discussed in greater detail below.

Further referring to FIG. 2, which is a partial cross-sectional view of a coated turbine nozzle 27, aluminum particles 54 carried within layer 52 are suspended within binder materials (not shown) in the paint formulation. These binder materials, along with any protective coating material that may be applied to the aluminum particles, bind the layer to the nozzle surface and prevent aluminum particles 54 from combining with oxygen to form aluminum oxide and thereby retain their luster or sparkle. These binder materials will be removed, i.e., vaporized, by a first thermal treatment step that will be further discussed below and is not otherwise addressed herein. Aluminum particles 54 preferably have a platelike morphology that will be substantially oriented parallel to surface 51 after application of the paint. More preferably, aluminum particles 54 are about ½ micron in thickness and are substantially equally distributed within layer 52. These particles preferably have an aspect ratio of between about 100:1 to about 10:1, 20:1 being the most preferred. Particle aspect ratios exceeding this upper range are difficult to apply by spraying, and ratios below this lower range have decreased "coverability." Although the available commercial paints have fixed particle shapes and aspect ratios, it is envisioned that new formulations may be developed that include high aspect ratio particles. The actual size of the particles is limited by the size of the orifice through which the mixture must flow, but high aspect ratio particles are preferred.

Figure 3:
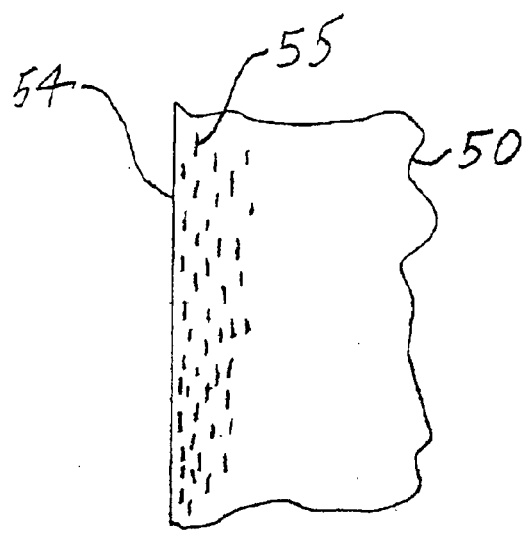
FIG. 3 is the enlarged partial cross sectional view of FIG. 2 of aluminum diffusing into the substrate by application of heat in the substantial absence of oxygen.

After the paint has been allowed to dry on the substrate, which is accomplished by evaporation of the high volatility carrier fluid, the coated component is subjected to a heating operation to permanently bond the aluminum to the substrate surface while eliminating binders. In preparation for this first heating step, substrate 50 is placed in an environment, such as a substantially fluid-tight oven or heating chamber, having an extremely low oxygen partial pressure, or having a substantial absence of oxygen. This may also be accomplished by an environment filled with inert gases, such as argon, helium, or even hydrogen or nitrogen, although a vacuum of sufficient magnitude may be employed. Once substrate 50 has been placed in the desired environment or the conditions of the desired environment have been achieved, substrate 50 having applied layer 52 are subjected to a first heat treatment. During the first heat treatment, the environment temperature reached and maintained for the duration of the first heat treatment may range from about 600° C. (1,100° F.) to about 1,000° C. (1,830° F.). The purpose of the heat treatment is to remove any remaining solvent and remove organic binder while diffusing aluminum into the substrate surface a small distance. One having skill in the art realizes that the duration of the first heat treatment varies depending upon the temperature selected, since the rate of diffusion of aluminum is exponentially affected by temperature. For example, substrate 50 will typically require about fifty hours of exposure at about 600° C. (1,100° F.), or about one hour of exposure at about 1,000° C. (1,830° F.) to achieve substantially the same results, i.e., same depth of diffusion. Therefore, any number of heat/exposure combinations may be employed as a matter of manufacturing convenience, so long as the results achieved substantially mirror the results of the 600° C./1,000° C. (1,110-1,830° F.) exposures just described. Once this first heat treatment has been completed, referring to FIG. 3, a significant amount of diffused aluminum 55 is diffused into substrate 50 and binders have been removed, although a portion of aluminum 54 remains distributed along substrate 50, forming an alloy with the interdiffused substrate.

After the first heat treatment has been completed, substrate 50 including aluminum 54, 55 which remains from previously applied layer 52 (FIG. 2) is subjected to a second heat treatment. In essence, temperature/exposure of the second heat treatment is substantially similar to that previously described for the first heat treatment. However, the major difference between the two heat treatments is that the second heat treatment is performed in the presence of oxygen. This oxygen exposure promotes the formation of an aluminum oxide layer 56 along the exposed surface of substrate 50. Some aluminum will diffuse outward from the substrate because of the affinity of aluminum for oxygen, but some aluminum will remain in the substrate and serve as a reservoir of aluminum for future uses while burning off any binders that were not removed during the first heat treatment. Aluminum 54 remaining on the surface oxidizes and a portion of the diffused aluminum 55 that had previously diffused into substrate 50 during the first heat treatment migrate to the substrate surface so as to form a continuous tightly adherent aluminum oxide layer 56. Preferably, aluminum oxide layer 56 is from about one to about ten microns thick, although this layer may permissibly be up to about ten mils (0.010 inches) in thickness.

Figure 5:
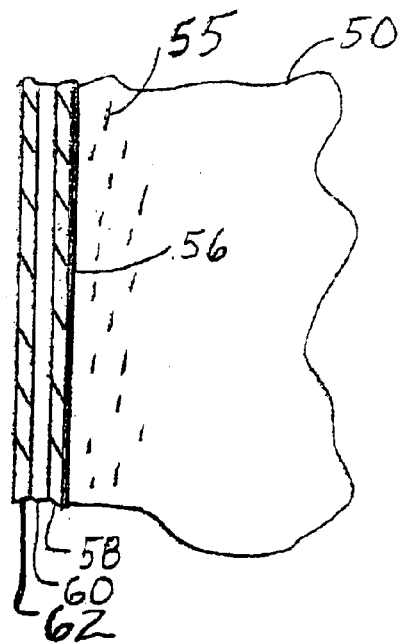
FIG. 5 is the enlarged partial cross sectional view of FIG. 4 after application of a heat rejection coating over the aluminum oxide layer.

Referring to FIG. 5, after aluminum oxide layer 56 has been formed, a smooth protective heat rejection coating overlying layer 56 may be applied. This coating may be chemical vapor deposited via a reagent of tantalum ethoxide which flows into the environmental chamber containing substrate 50. It is critical that the protective heat rejection layer be smooth to controllably reflect radiative energy away from substrate 50 and into the gas stream. Otherwise, the radiative energy may be scattered or reflected toward unintended regions of the engine, with adverse results. Upon contacting substrate 50, the tantalum ethoxide deposits a tantalum oxide layer 58 and ethanol by-products. Similarly, a platinum oxide layer 60 can be formed by chemical vapor deposition, which is then followed by application of a second tantalum oxide layer 62 that is applied over platinum oxide layer 60. The sandwiching tantalum oxide layers 58, 62 add stability to platinum oxide layer 60, especially at higher temperatures. The ethanol by-products, being volatile, are readily removed. It is also contemplated that platinum and tantalum layers can be applied. Other noble metal layers that may be applied, in addition to platinum and tantalum, include palladium and rhodium. Other protective layers that may be applied in addition to tantalum oxide are titanium oxide, silicon oxide, zirconium oxide, hafnium oxide, aluminum oxide, chromium oxide and mixtures thereof.

Formation of the aluminum oxide layer 56 over substrate 50 provides an effective diffusion barrier for subsequently applied overlying protective thermal coating layers. The aluminum oxide layer, being inherently stable at high temperatures and tightly adhering to the substrate surface substantially prevents migration of thermal coating materials into the substrate which degrades the capability of the thermal coating to reflect radiative heat energy away from the substrate surface. By helping maintain the beneficial attributes of the thermal coating, component surface temperatures are reduced, which extends the service life of components subjected to elevated temperatures.

Successful exposure testing of coupons, typically material samples approximately one inch in diameter, have been conducted. Such testing typically includes exposing the coupon to a heat-up period from ambient to a first preselected temperature level, over a preselected time interval, such as about twenty minutes, holding the coupon at the first preselected temperature level for a second preselected time interval, such as about forty minutes, before cooling the part in a manner similar to the heating-up period, and repeating these heat-up cool-down cycles to/from the first preselected temperature for a predetermined number of times, typically several hundred. If the coupon survives the cyclic testing at the first preselected temperature, the temperature is raised by some increment, typically several hundred degrees to a second preselected temperature. The process is continued until the coating on the coupon spalls. The present invention has exceeded about 1,000° C., (1800° F.) which typically exceeds the upper temperature range (760–871° C. for land-based turbines which utilize iron alloys, 871–1204° C. for non land-based turbines which utilize nickel or cobalt alloys) a turbine nozzle may see in service.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for applying a coating system to a substrate surface of an aircraft engine component to prevent interdiffusion between the substrate surface and a protective heat rejection layer applied over the substrate surface when the heat rejection layer is exposed to elevated temperatures, the method comprising the steps of:
   a) providing an aircraft engine component having at least one surface as a substrate surface;
   b) applying at least one layer of a solution comprising a carrier fluid, binder and aluminum over the substrate surface of the aircraft component;
   c) allowing the surface to dry;
   d) heating the coated substrate to a first preselected temperature for a first preselected time period in the substantial absence of oxygen to diffuse at least a portion of the aluminum into the substrate surface and to remove volatile portions of the at least one layer;
   e) then heating the coated substrate to a second preselected temperature for a second preselected time period in the presence of oxygen to form a continuous, tightly adherent oxidized aluminum layer on the substrate while removing any remaining volatile portions of the at least one layer; and
   f) applying at least one non-ceramic protective heat rejection layer selected from the group consisting of tantalum, platinum, palladium and rhodium directly on the oxidized aluminum layer.

2. The method of claim 1 wherein the component is a turbine nozzle.

3. The method of claim 1 wherein the substrate is a superalloy.

4. A method for applying a coating system to a substrate surface of a component to prevent interdiffusion between the substrate surface and a protective heat rejection layer applied over the substrate surface when the heat rejection layer is exposed to elevated temperatures, the method comprising the steps of:
   a) applying at least one layer of a solution comprising a carrier fluid, binder and aluminum over a substrate surface of a component;
   b) allowing the surface to dry;
   c) heating the coated substrate to a first preselected temperature for a first preselected time period in the substantial absence of oxygen to diffuse at least a portion of the aluminum into the substrate surface and to remove volatile portions of the at least one layer;
   d) then heating the coated substrate to a second preselected temperature for a second preselected time period in the presence of oxygen to form a continuous, tightly adherent oxidized aluminum layer on the substrate while removing any remaining volatile portions of the at least one layer; and
   e) applying a layer of tantalum oxide over the oxidized aluminum layer followed by a layer of platinum oxide that is applied over the tantalum oxide layer.

5. A method for applying a coating system to a substrate surface of a component to prevent interdiffusion between the substrate surface and a protective heat rejection layer applied over the substrate surface when the heat rejection layer is exposed to elevated temperatures, the method comprising the steps of:
   a) applying at least one layer of a solution comprising a carrier fluid, binder and aluminum over a substrate surface of a component;
   b) allowing the surface to dry;
   c) heating the coated substrate to a first preselected temperature for a first preselected time period in the substantial absence of oxygen to diffuse at least a portion of the aluminum into the substrate surface and to remove volatile portions of the at least one layer;
   d) then heating the coated substrate to a second preselected temperature for a second preselected time period in the presence of oxygen to form a continuous, tightly adherent oxidized aluminum layer on the substrate while removing any remaining volatile portions of the at least one layer; and
   e) applying a layer of platinum oxide over the oxidized aluminum layer followed by a layer of tantalum oxide that is applied over the platinum oxide layer.

6. A method for applying a coating system to a substrate surface of a component to prevent interdiffusion between the substrate surface and a protective heat rejection layer applied over the substrate surface when the heat rejection layer is exposed to elevated temperatures, the method comprising the steps of:
   a) applying at least one layer of a solution comprising a carrier fluid, binder and aluminum over a substrate surface of a component;
   b) allowing the surface to dry;
   c) heating the coated substrate to a first preselected temperature for a first preselected time period in the substantial absence of oxygen to diffuse at least a portion of the aluminum into the substrate surface and to remove volatile portions of the at least one layer;
   d) then heating the coated substrate to a second preselected temperature for a second preselected time period in the presence of oxygen to form a continuous, tightly adherent oxidized aluminum layer on the substrate while removing any remaining volatile portions of the at least one layer; and
   e) applying a layer of tantalum oxide over the oxidized aluminum layer followed by a layer of platinum oxide that is applied over the tantalum oxide layer, followed by a second layer of tantalum oxide that is applied the platinum oxide layer.

* * * * *

UNITED STATES PATENT AND TRADEMARK OFFICE
CERTIFICATE OF CORRECTION

PATENT NO. : 6,884,461 B2
DATED : April 26, 2005
INVENTOR(S) : Ackerman et al.

It is certified that error appears in the above-identified patent and that said Letters Patent is hereby corrected as shown below:

Column 8,
Line 49, "a layer" should read -- a first layer --.

Signed and Sealed this

Seventh Day of February, 2006

JON W. DUDAS
*Director of the United States Patent and Trademark Office*